(12) United States Patent
Muray et al.

(10) Patent No.: US 8,075,942 B1
(45) Date of Patent: Dec. 13, 2011

(54) MICROENGINEERED OPTICAL FILTERS THAT CLOSELY MATCH PREDEFINED TRANSMISSION CURVES AND SYSTEMS AND METHODS OF MANUFACTURE

(75) Inventors: Andrew Julius Muray, Portland, OR (US); Kathleen Muray, Clayton, CA (US)

(73) Assignee: Nanoport Technologies, Portland, OR (US)

( * ) Notice: Subject to any disclaimer, the term of this patent is extended or adjusted under 35 U.S.C. 154(b) by 325 days.

(21) Appl. No.: 12/405,928

(22) Filed: Mar. 17, 2009

Related U.S. Application Data

(60) Provisional application No. 61/038,707, filed on Mar. 21, 2008.

(51) Int. Cl.
*B05D 16/52* (2006.01)
(52) U.S. Cl. .................... 427/10; 427/8; 427/162
(58) Field of Classification Search .......... 427/8, 9, 427/10, 162; 347/15; 382/141
See application file for complete search history.

(56) References Cited

U.S. PATENT DOCUMENTS

| 6,542,876 | B1 * | 4/2003 | Kikuchi et al. | 706/13 |
| 7,138,156 | B1 * | 11/2006 | Myrick et al. | 427/10 |

OTHER PUBLICATIONS

William H. Press, Saul A. Teukolsky, William T. Vetterling, Brian P. Flannery. Numerical Recipes: The Art of Scientific Computing. Cambridge University Press, 1987. 274-334.

* cited by examiner

*Primary Examiner* — Audrey Y Chang
(74) *Attorney, Agent, or Firm* — James L. Lund

(57) ABSTRACT

Disclosed are methods for producing optical filters on a substrate. In particular, methods for producing microengineered optical filters for the ultraviolet/visible/infrared portions of the electromagnetic spectrum are disclosed, as well as a computer-based system and method for precisely matching predefined target transmission spectra using various coating materials whose spectra can be combined and weighted for the matching. In addition, methods for producing printed optical filters comprising multiple coating components to produce composite optical filters whose transmission spectra match predefined target filter spectrum specifications are disclosed, where the thickness and fill factor of each component coating is tailored, based on the weighting of each component coating transmission spectrum.

8 Claims, 12 Drawing Sheets

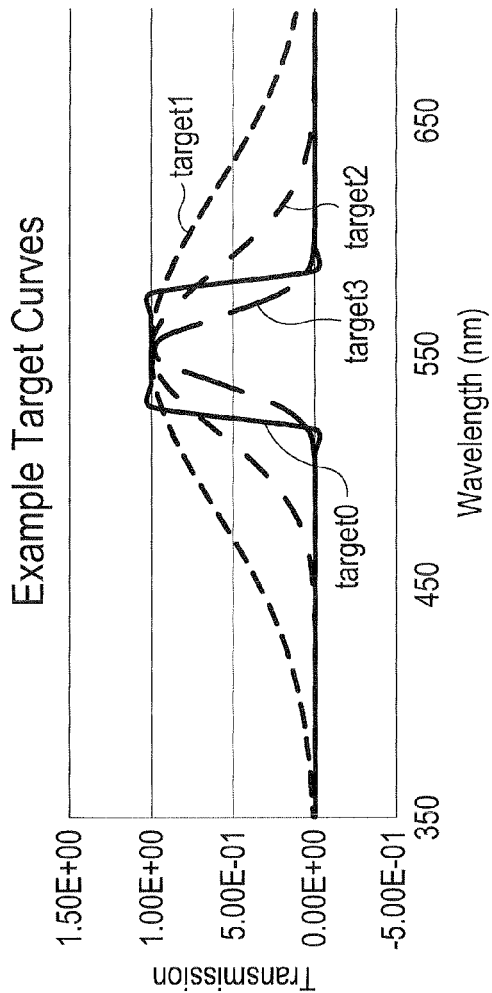
FIG. 9 Example Target Curves
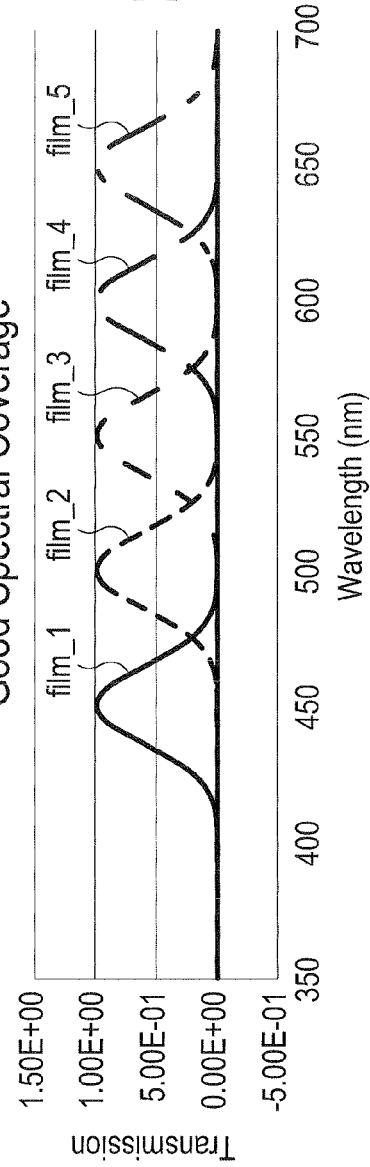
FIG. 10 Thin Film Transmission Curves Showing Good Spectral Coverage

MICROENGINEERED OPTICAL FILTERS THAT CLOSELY MATCH PREDEFINED TRANSMISSION CURVES AND SYSTEMS AND METHODS OF MANUFACTURE

RELATED APPLICATION DATA

This application claims priority from U.S. provisional application Ser. No. 61/038,707 filed Mar. 21, 2008, that we incorporate by reference.

FIELD OF THE INVENTION

The present invention relates to optical filters whose transmission spectra closely match predefined transmission spectra specifications.

BACKGROUND OF THE INVENTION

Optical filters, which are filters used to filter electromagnetic radiation in the ultraviolet/visible/infrared portions of the electromagnetic spectrum, are used in a multitude of applications, and typically consist of continuous thin films that are deposited on a substrate. FIG. 1 shows an optical filter 10, which comprises a thin film 12 that has been deposited on substrate 18.

The intensity of light in a non-conductive media at thickness z, shown in FIG. 1, is given by $$I = I_0 e^{(-\alpha z)}$$

where I is the intensity at depth z, $I_0$ is the intensity at a reference thickness, and $\alpha$ is the absorption coefficient of the material.

The transmission, or transmissivity, T, of a thin film as a function of thickness z and wavelength $\lambda$ and is defined as $$T(z,\lambda) = I(z,\lambda)/I_0$$

It can thus be shown that $$T(z,\lambda) = T_0^{(z/z_0)} \quad (1)$$

where $T_o$ is a reference transmission of the film at thickness $z_0$ for any thin film.

FIG. 2 shows example transmission curves for a continuous thin film as a function of thin film thickness in the z direction, the same direction as the incident light. As the thickness of a given thin film material increases, the transmission of light through it generally decreases for a given wavelength.

FIG. 3 illustrates a thin-film stack 20, consisting of multiple layers 22, 24, and 26 deposited on substrate 28 made of suitable optical material.

The above equation (1) can be generalized for n layers. For n=3 thin films, a, b, and c, $$T(z,\lambda) = Ta_0^{(za/za_0)} * Tb_0^{(zb/zb_0)} * Tc_0^{(zc/zc_0)} \quad (2)$$

where $Ta_0$, $Tb_0$, and $Tc_0$ are the respective reference transmissions of films of thickness $za_0$, $zb_0$ and $zc_0$, respectively. This expression can be generalized to provide the total transmission of any stack of n thin film layers.

FIG. 4 shows an exemplary experimentally measured two-layer filter transmission spectrum, as well as the experimentally measured spectra of the individual continuous film layers C1 and C2 making up the two-layer filter. Note that the two-layer spectrum, shown in a dark solid line, may alternately be determined by multiplying the individual coating layer transmissions at a given wavelength.

In designing useful products, product designers typically design optical filters by defining a target transmission spectrum for the particular application, and then send their specifications to thin film filter specialists to manufacture, through a lengthy trial and error process, a film, or combination of films that will produce a transmission spectrum that resembles the one specified. This process is highly iterative with the design cycle taking weeks, months, or even years to satisfactorily match a given target transmission spectrum for an optical filter.

Conventional techniques for fabricating thin-film optical filters include, for example, vacuum vapor deposition, deposition by electron-beam evaporation (EBE), techniques based on ion-assisted deposition (IAD), reactive ion plating, and ion-beam sputtering. All techniques utilize similar well-established batch manufacturing sequences that are slow, expensive, and only accommodate the production of optical filters whose size or "footprint" is on the order of centimeters across. Additionally, because the control of thin film filter layer thickness is often difficult to precisely control, it can difficult, if not impossible, to manufacture thin film filters that closely match predefined transmission spectra.

BRIEF DESCRIPTION OF THE INVENTION

The present disclosure solves many of the disadvantages associated with existing thin film filters. Microengineered optical filters whose resulting transmission spectra closely match design target spectra specifications may be produced while using a limited number of component coating materials.

A system is herein disclosed as comprising a printing device having a printing resolution, and a processor. The processor is configured to receive a target transmission spectrum for an optical filter design, wherein an optical filter filters electromagnetic radiation in the ultraviolet, visible, infrared, or combinations thereof, regions of the electromagnetic spectrum. The processor is further configured to select a set of one or more filter component materials based, at least in part, on a stored transmission spectrum of each component, and to multiply the stored transmission spectrum of each selected filter component material by an associated component weight factor to produce a weighted transmission spectrum for each selected filter component material. In addition, the processor is configured to combine the weighted transmission spectrum of each selected filter component material to produce a composite transmission spectrum, and optimize the value of the component weight factor associated with each component material so that the composite transmission spectrum matches the received target transmission spectrum.

A method for creating an optical filter is herein disclosed. The method comprises sending a target transmission spectrum for an optical filter design over a network to a processor, wherein the processor is configured to select a set of one or more filter component materials based, at least in part, on a stored transmission spectrum of each component, and multiply the stored transmission spectrum of each selected filter component material by an associated component weight factor to produce a weighted transmission spectrum for each selected filter component material. The processor is further configured to combine the weighted transmission spectrum of each selected filter component material to produce a composite transmission spectrum, and optimize the value of the component weight factor associated with each component material so that the composite transmission spectrum matches the received target transmission spectrum.

A computer-readable medium having instructions stored thereon is disclosed herein. When the instructions are executed by at least one device, the instructions are configured to receive a target transmission spectrum for an optical filter design, select a set of one or more filter component materials based, at least in part, on a stored transmission spectrum of each component, and multiply the stored transmission spectrum of each selected filter component material by an associated component weight factor to produce a weighted transmission spectrum for each selected filter component material. The instructions are further configured to combine the weighted transmission spectrum of each selected filter component material to produce a composite transmission spectrum, and optimize the value of the component weight factor associated with each component material so that the composite transmission spectrum matches the received target transmission spectrum.

An optical filter is disclosed herein comprising a substrate material having a top surface and a bottom surface, wherein the top surface has an electromagnetic radiation receiving area, and one or more coating materials, wherein each coating material comprises a coating material transmission spectrum. The optical filter also comprises one or more optical coatings, wherein each optical coating includes an associated one of the one or more coating materials deposited as a plurality of discontinuous thin films on the substrate, wherein each optical coating is characterized by a fill factor. The fill factor of an optical coating comprises a fraction of the electromagnetic radiation receiving area of the substrate that is covered by the associated coating material. A resulting optical filter transmission spectrum is determined by the fill factor of each optical coating as well as the coating material transmission spectrum of each associated coating material.

BRIEF DESCRIPTION OF THE DRAWINGS

FIG. 9 shows exemplary target transmission spectra used in the design of various exemplary optical filters.

FIG. 10 shows exemplary transmission spectra of several potential filter component materials whose thickness and fill factors can be determined to produce a composite transmission spectrum that matches a target transmission spectrum.

DETAILED DESCRIPTION

Figure 1:
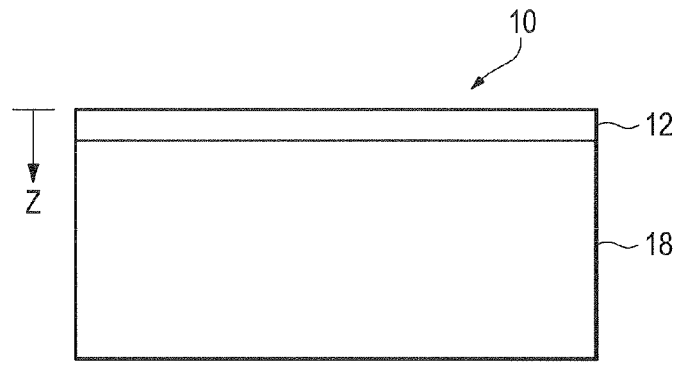
FIG. 1 shows a traditional continuous thin film optical filter.
Figure 2:
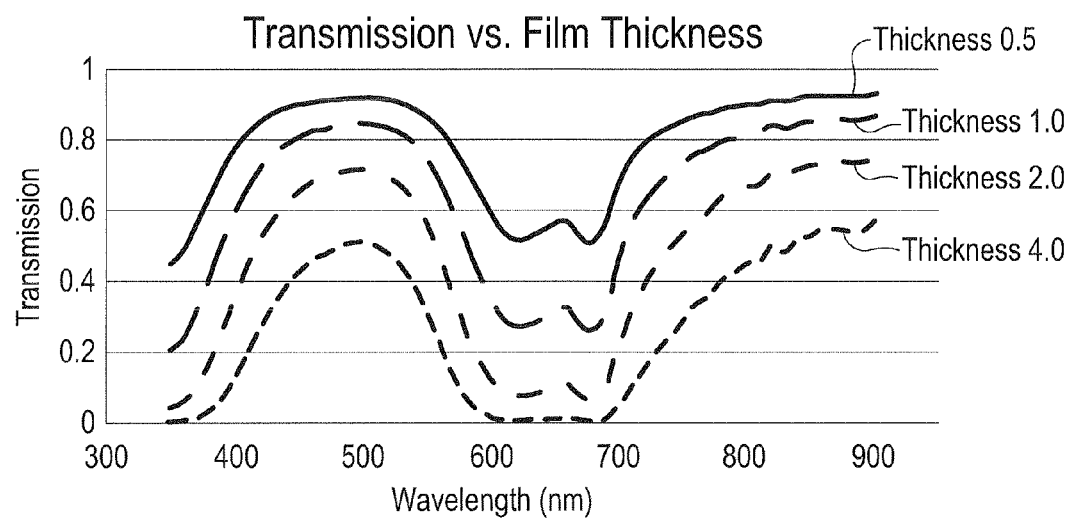
FIG. 2 is a graph of transmission spectra for a thin film optical filter material as a function of thin film thickness.
Figure 3:
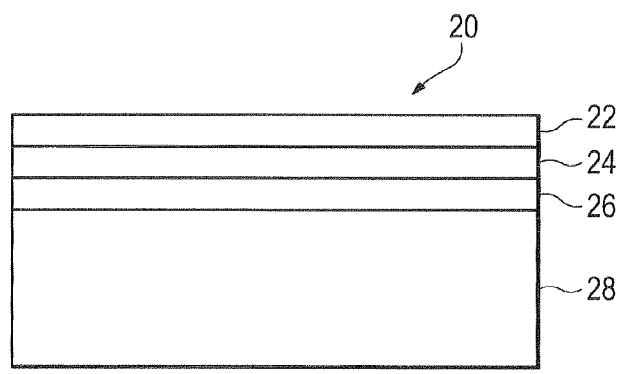
FIG. 3 shows a traditional multi-layered continuous thin film optical filter.
Figure 4:
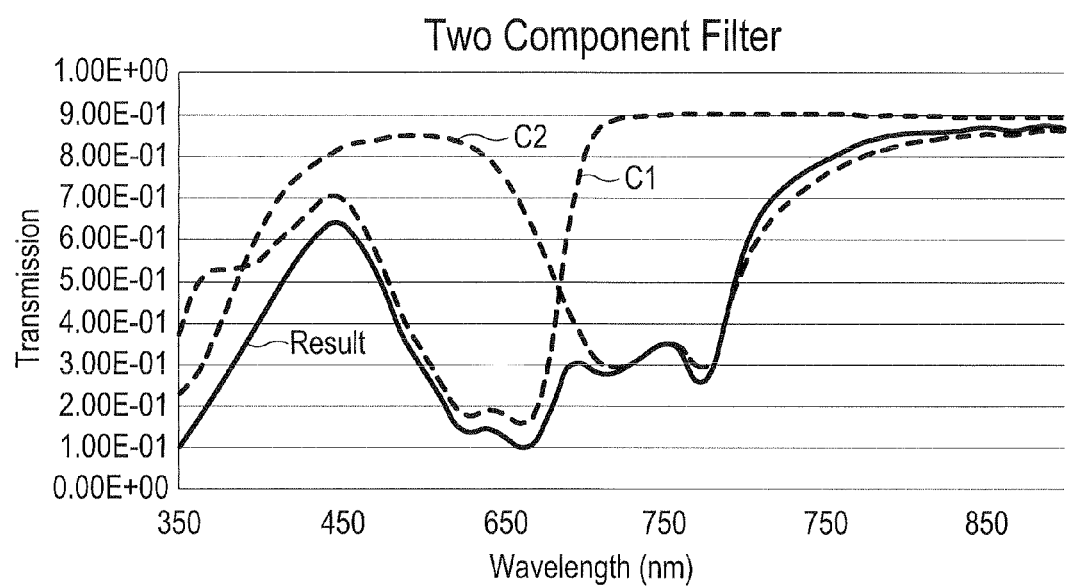
FIG. 4 is a graph of transmission spectra for a two-component continuous thin film optical filter, which also shows the spectra for the individual components.

In the drawings like reference numerals generally designate identical or corresponding parts throughout the several views.

System

Figure 5:
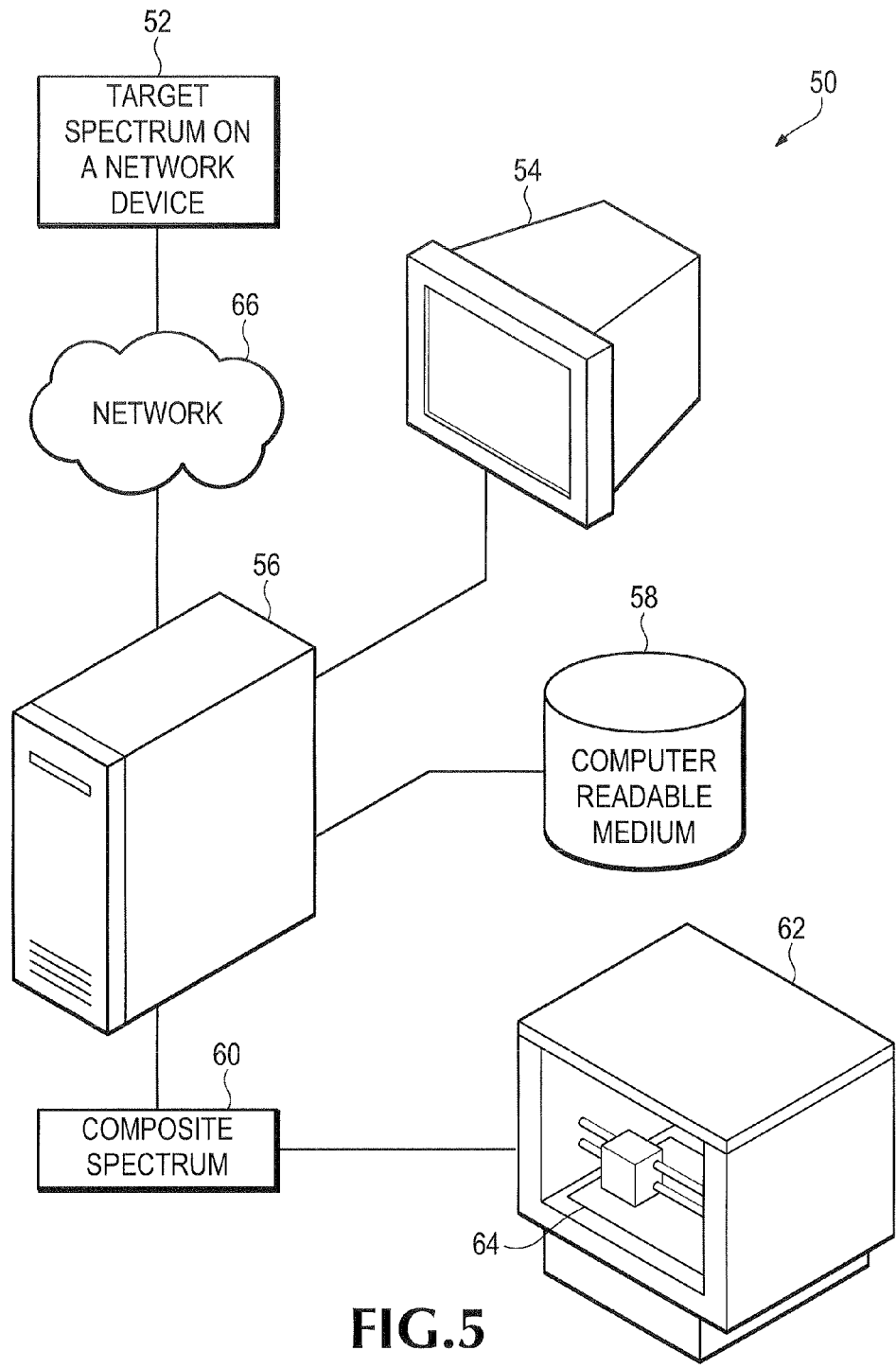
FIG. 5 illustrates an exemplary computer-based system upon which disclosed embodiments may be practiced.

Referring now to FIG. 5, there is shown an exemplary computer system 50 upon which embodiments may be practiced. In general, computer system 50 comprises a processor 56 and a printing device 62. A target spectrum of an optical filter 52 is received by processor 56 through various means comprising through a network, the internet, or any type of computer readable media such as a floppy disk, a CD, a DVD, a flashdrive, a zipdrive, a hard disk, or the like. FIG. 5 shows the example where the target spectrum 52 is received from a network device, for example a remote processor, by processor 56 through a network 66, such as the internet. Such receiving means may include receipt through a webserver or through a website or webportal. The target spectrum 52 may be displayed on an imaging device 54. The imaging device 54 may include any conventional device used to display or capture an image, such as a camera, scanner, or monitor. The processor 56 is configured to receive the target spectrum 52 and to store the target spectrum 52 in a storage database on computer readable medium 58. In addition, the storage database is configured to store the transmission spectra of various coating materials that may be selected by the processor 56 to comprise composite spectrum 60, which closely matches the target spectrum 52. The processor 56 is further configured to execute instructions stored on the computer readable medium 58, to cause the processor 56 to select a set of stored component spectra, each associated with a printable coating, and to weight each of the component spectra to obtain a composite spectrum that closely matches the received target spectrum 52. The processor is further configured to determine a fill factor (area fraction) and thickness of a given coating to be printed on a substrate, based at least in part on the relative weight given to that coating's transmission spectrum. The fill factor is defined herein as the area fraction of a total optical filter area covered by a particular coating. For example, for an optical filter with an incident area of 10.00 cm$^2$, if a 5.00 cm$^2$ is covered by coating A, the fill factor for coating A is 0.500. Likewise, if 3.00 cm$^2$ is covered by coating B, the fill factor for coating B is 0.300. Note that the sum of the fill factors does not have to equal 1, since coatings may overlap one another.

The printing device 62 may include any device capable of printing a pattern on a substrate 64 and may be connected to the processor 56 directly, or, for example through a network, such as the interne or "web." The processor 56 may be configured to operate one or both of the imaging device 54 and the printing device 62. In one embodiment, the processor 56 is provided as part of the printing device 62.

The printing device 62 may comprise an ink jet type or a drop on demand type printer, and is configured to deposit one or more coatings on the substrate 64 during a print cycle. The printing device 62 may be understood as having a printing resolution. For example, the printing resolution may be 600 dots per inch (dpi), 1200 dpi, or any other resolution known to one skilled in the art. The printing device may further have a maximum printing resolution, wherein the printer may be configured to print using the maximum printing resolution, or some printing resolution which is less than the maximum printing resolution. For example, a Dimatix 2800 Ink Jet Materials Printer available from Fujifilm Corporation, whose maximum resolution setting is capable of printing features on the order of microns across, is able to produce individual optical filters up to approximately 10 cm by 10 cm.

Storage of Computer Programs

One or more embodiment may be implemented or embodied in computer software (also known as a "computer program" or "code"; we use these terms interchangeably). Programs, or code, may be stored in a digital memory that can be read by a digital processor. We use the term "computer-readable medium" (or alternatively, "machine-readable storage medium") to include all of the foregoing types of memory, as well as new technologies that may arise in the future, as long as they are capable of storing digital information in the nature of a computer program or other data, at least temporarily, in such a manner that the stored information can be "read" by an appropriate digital processor. By the term "computer-readable" we do not intend to limit the phrase to the historical usage of "computer" to imply a complete mainframe, mini-computer, desktop or even laptop computer. Rather, we use the term to mean that the storage medium is readable by a digital processor or any digital computing system. Such media may be any available media that is locally and/or remotely accessible by a computer or processor, and it includes both volatile and non-volatile media, removable and non-removable media.

Optical Filters

Figure 6A:
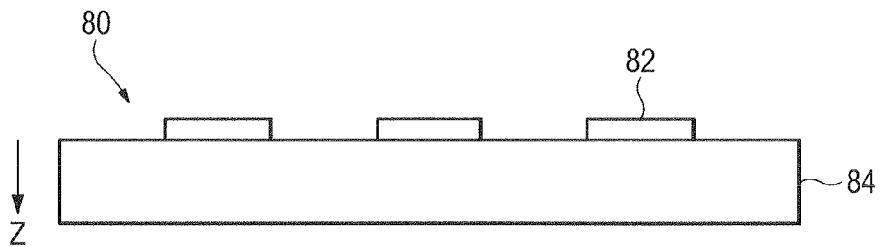
FIG. 6a is a side view of a microengineered optical filter.
Figure 6B:
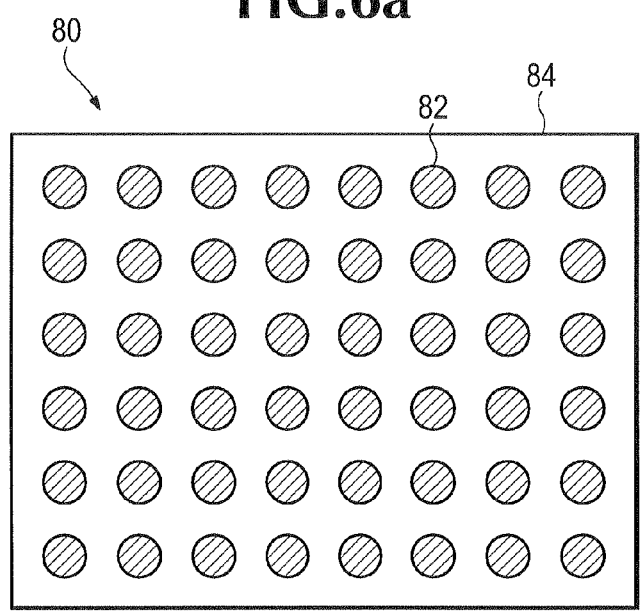
FIG. 6b is a frontal or top view of a microengineered optical filter having a fairly dense pattern density.
Figure 6C:
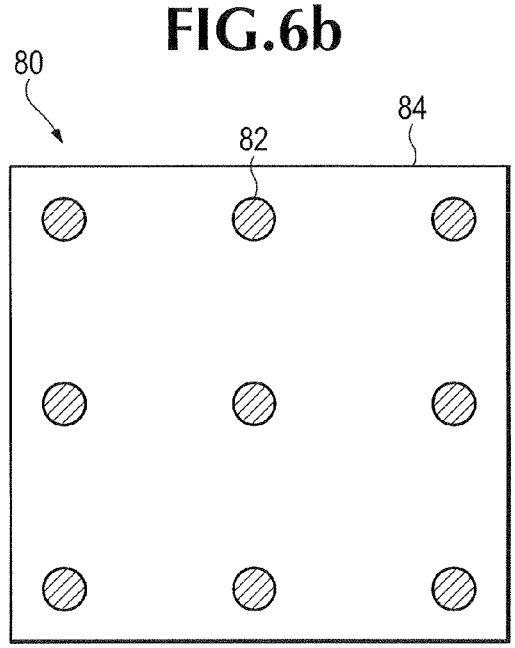
FIG. 6c is a frontal or top view of a microengineered optical filter having a fairly sparse pattern density.

Turning now to FIGS. 6a, 6b, and 6c there are shown microengineered optical filters 80 made with the system 50 described above. FIG. 6a is a side view showing the deposited coating 82 upon substrate 84. FIGS. 6b and 6c show top views of such filters. The optical filters shown comprise an array of circular thin film "dots" whose diameter is may be tailored over many orders of magnitude, for example from 10 centimeters across to as small as 10 nanometers across. Dot size is typically on the order of tens of micrometers to millimeters. The dots, which can comprise any shape, are printed on a suitable substrate, typically optical-quality glass or plastic. The pattern density, or "fill factor" of FIG. 6b is fairly dense, and that of FIG. 6c is sparse.

The microengineered optical filters were made by filtering coating solutions and heating the solutions to 30 degrees Celcius. The substrate, glass or plastic, was heated to 40-60 degrees Celcius prior to printing the coating materials on them. If multiple layers are used, additional prints are typically performed after the coating solvent has had a chance to evaporate, although the simultaneous printing of multiple coating solutions may be preferred under particular circumstances. After printing, a soft post-bake is typically done at 60 degrees Celcius for several hours, and a hard post bake of the filter at 100 degrees Celcius is done to evaporate any remaining solvent from the coating. One or more clear coat layers may then be applied to protect the resulting filter and to dissipate electrostatic charge buildup on the resulting filter.

Figure 7:
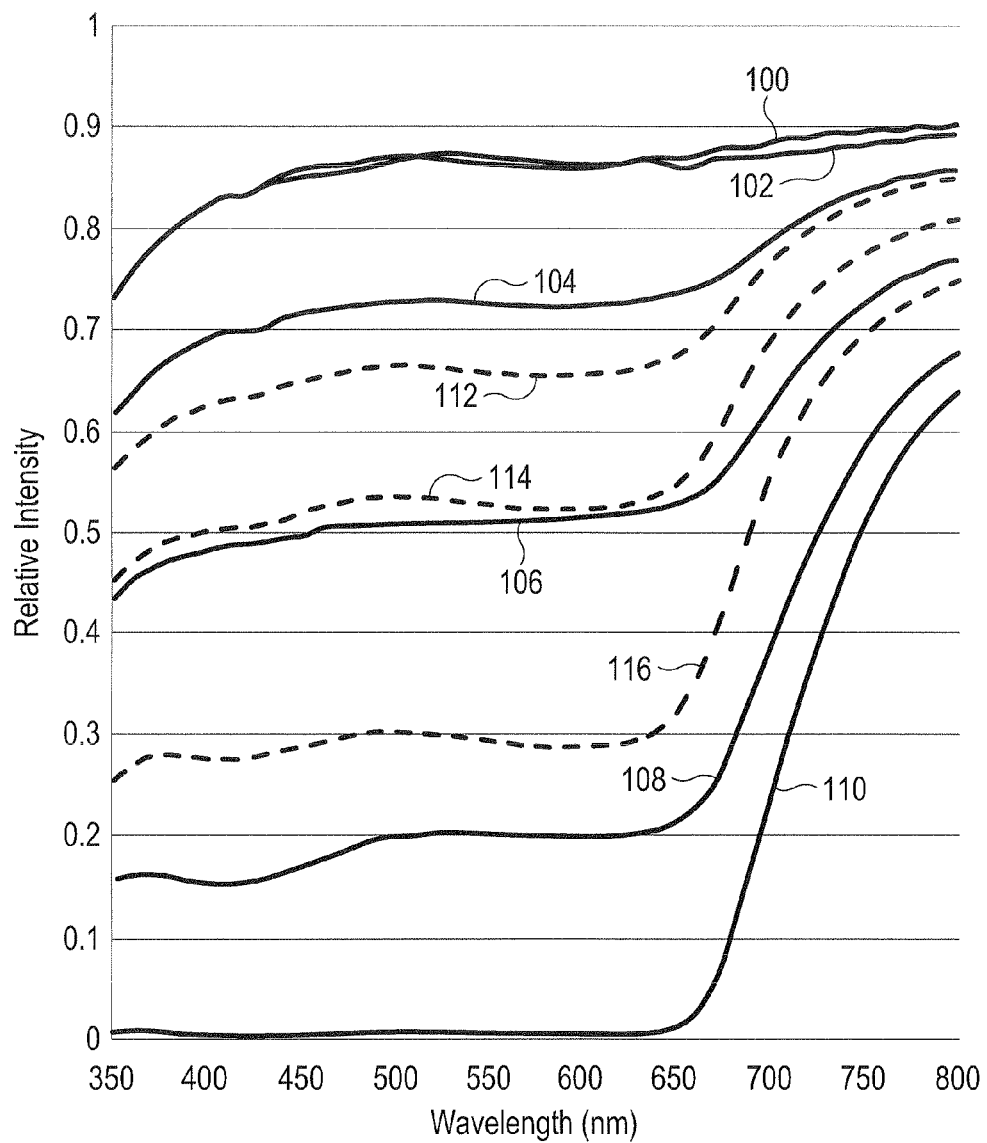
FIG. 7 shows transmission spectra for the microengineered optical filters of Table 1 prior to the normalization of the data with respect to the spectrum of the uncoated substrate.

FIG. 7 shows transmission spectra of several microengineered optical filters, including the spectrum of an uncoated substrate for normalization purposes. The optical transmission data was collected using an optical spectrometer that measures the relative intensity of transmitted electromagnetic energy in the optical portion of the electromagnetic spectrum. The electromagnetic energy in such tests was incident in the z-direction shown in FIG. 6a over an area, for example a circular area corresponding to an aperture, which includes an area of the microengineered optical filter 80 that comprises a plurality of the coating 82 "dots" produced from the printed coating. Further information for each microengineered optical filter may be seen in Table 1, which has been normalized with respect to the spectrum measured of an uncoated substrate. Besides arrays of circular dots, some of the filters comprise arrays of squares, or other shapes, as indicated in Table 1. In general, the transmission decreases as the fill factor (f factor), or area fraction, increases for a given thin film thickness.

TABLE 1

Microengineered Optical Filter Data

| Reference Number for FIG. 7 | Sample Number | Theoretical Transmission At $\lambda$ = 550 nm | Measured Transmission At $\lambda$ = 550 nm | Pattern | Fill Factor |
|---|---|---|---|---|---|
| 100 | 00000 | 1.00 | 1.00 | substrate only | 0.000 |
| 102 | p10w1 | 0.93 | 1.00 | circular | 0.067 |
| 104 | p10w2 | 0.83 | 0.83 | circular | 0.166 |
| 106 | p10w5 | 0.57 | 0.59 | square | 0.428 |
| 108 | p10w7 | 0.22 | 0.23 | square | 0.782 |
| 110 | p10w9 | 0.00 | 0.01 | NA | 1.000 |
| 112 | P5w1 | 0.71 | 0.76 | circular | 0.290 |
| 114 | p4w1 | 0.51 | 0.61 | circular | 0.490 |
| 116 | P3w1 | 0.40 | 0.34 | circ/square/elliptical | 0.605 |

Figure 8:
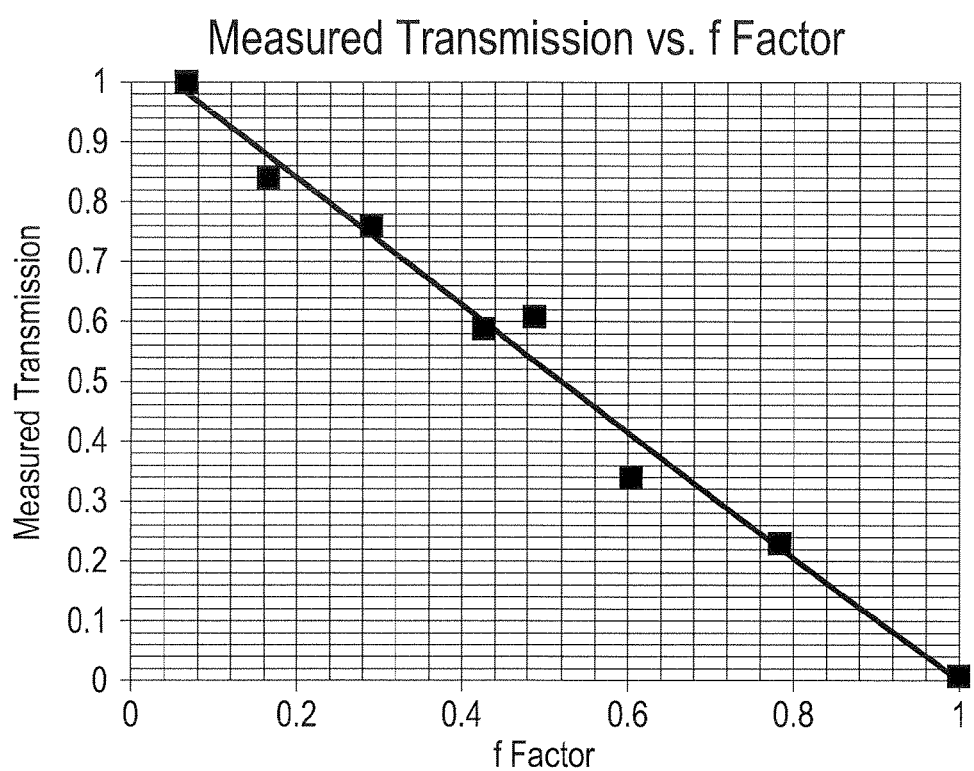
FIG. 8 is a graph showing the relationship between optical filter transmission versus fill factor, of the microengineered thin film filters whose transmission spectra are shown in FIG. 7.

FIG. 8 shows a graph of measured transmission (or relative intensity $I/I_o$) versus the fill factor (f factor) at wavelength 550 nm for the microengineered optical filters of Table 1, where the discontinuous thin films are of thickness $z_o$. The experimental data show a linear relationship between the coating fill factor and light transmission (which equals the transmissivity here) with the transmission equaling $T_o$ when there is 100% coverage of the substrate. The variation from complete linearity is due to slight shape variations from ideal, (e.g. patterned rectangles have slightly rounded corners in reality, and there is a slight variation in the thickness of the patterned shapes).

The effective (or theoretical) transmission through a microengineered optical filter comprising one coating may be closely approximated according to the formula, $$T(z,\lambda)=(T_o-1)*f+1 \quad (3)$$

where f is the fill factor, or fraction of the total area that is covered by film material at thickness $1.0*z_o$. Calculated results are given in Table 1 for the microengineered optical filters for comparison with the measured transmission data.

The effective (or theoretical) transmission at a given wavelength through a microengineered optical filter comprising n discontinuous layers may be derived from this relationship. For example, the effective transmission for n=3 discontinuous layers (a, b, and c), may be closely approximated according to the formula, $$T(z,\lambda)=((Ta_0-1)*fa_0+1)*((Tb_0-1)*fb_0+1)* \\ ((Tc_0-1)*fc_0+1) \quad (4)$$

Target Spectrum Matching with Weighted Component Spectra

Turning now to FIGS. 9 and 10, the concept of matching a supplied target spectrum by combining and weighting the spectra of a set of potential coating materials is shown. FIG. 9 is a graph of several exemplary target spectra. A designer of optical devices supplies a target spectra, which provides a specification of the transmission spectra that he or she would like reproduced for his or her particular application. The size and shape of the target spectrum can vary, depending upon the particular application, and can be, for example, a broad bell-shaped spectrum shown as target 1 in FIG. 9, or a plateau-shaped spectrum shown as target 0. The target spectra of FIG. 9 have all been normalized to have a maximum transmission of 1.0. FIG. 10 shows exemplary spectra of potential coating materials, where, again, the spectra have each been normalized to have a maximum transmission of 1.0. In particular, FIG. 10 shows one spectrum for each of five potential coatings, labeled "film 1" through "film 5". The normalized spectrum of each coating is an inherent property to that particular coating material. In other words, the coating's spectrum is an intensive property of the coating material and does not depend upon the amount of coating present. In an actual optical filter, however, the amount of coating material that the electromagnetic radiation has to travel through effects the intensity of the energy that makes it through the filter. Consequently, composite spectra having a variety of shapes may be formed from these component coatings, based upon the relative amount of each coating component that the electromagnetic radiation has to travel through. The relative amount of each coating material may be characterized by a weighting factor and composite spectra may be built by combining each coating component spectrum multiplied by its associated weighting factor. The weighting factor may be thought of as the relative amount of a given coating material present in a composite filter. In the case of continuous coatings, the weighting factor is directly proportional to the relative coating thickness, and in the case of discontinuous filters the weighting factor is directly proportional to both the relative coating thickness and the relative fill factor of that coating to the other coatings.

Referring back to FIG. 5, the processor 56 of computer system 50 selects from potential candidate spectra to build a composite spectrum 60 that matches that of the target spectrum 52, using the stored database on computer readable medium 58, which houses the spectra of candidate coatings. A weighting factor is determined for each potential coating material that, when multiplied by that coating material's transmission spectrum produces a weighted component spectrum. The weighted component spectrum of each potential coating material is combined to produce a composite spectrum that is compared to the received target spectrum. An optimization of the composite spectrum to most closely match the target spectrum is completed using numeric methods described below.

Target Function Optimization Methods

Determining the component layer weighting factors to match a given transmission target curve is an optimization problem involving many variables and constraints. In an embodiment, a webpage interface is presented comprising one or more pull-down menus where a user, typically an optical system/component designer, inputs one or more variables and/or constraints relevant to his or her particular end application, for example parameters associated with the designed component. The webpage interface may also include a method for inputting the target transmission curve for the subsequent matching. A processor subsequently uses these inputs to produce optical filters meeting the user's specifications. Other variables and/or constraints may be determined by the particular coating component used or printing device used, for example the minimum and maximum printable coating thickness. Then one or more algorithms are used to determine an optimized set of n weighting factors corresponding to the n spectra of the n potential coating materials.

In a further embodiment the one or more algorithms may be presented as pull down menus for the user to select and/or combine as input to a processor that calculates an optimized composite transmission curve. The resulting optimized composite transmission may then be displayed to the user through the web interface, for example overlaid upon his or her target curve, for visual inspection and comparison with alternate solutions. In another embodiment, the user may submit an order the optimized microengineered optical filters that meet his or her specifications.

Many optimization algorithms may be used singly or in combination with others to "minimize the difference between" the target spectrum and the computed composite spectrum, where "minimize the difference between" is explained more fully below. For example, methods presented in Chapter 10 of *Numerical Recipes, the Art of Scientific Computing* (by Press, Flannery, Teukolsky and Vetterling, Cambridge University Press, ISBN 0 521 30811 9), incorporated herein by reference, may be used. In particular, one or more optimization algorithms selected from the group comprising parabolic interpolation, Brent's method, one-dimensional search with first derivatives, downhill simplex method, direction set (Powell's) methods, conjugate gradient methods, variable metric methods, linear programming, simplex method, or simulated annealing method may be used.

One algorithm that works well is the "steepest descent algorithm," otherwise known as the gradient descent method, used in optimization solvers. The constraints must be chosen to match the physical limitations of the problem, which include the minimum and maximum thicknesses of each of the component layers. There may be other constraints from optical conditions as well.

A goal function is used to minimize the difference between the target spectrum and the computed composite spectrum at multiple wavelengths. More particularly, the deviation of the composite spectrum from the target spectrum is minimized at multiple wavelengths. A choice of the number and location of these deviation measurements depend on the problem and desired accuracy. In an embodiment, the user may define or choose the number and location of the deviation measurements as well as the method for calculating the deviation through a web interface with the processor 56 of system 50. The goal function, or method for calculating the deviation of the composite spectrum from the target spectrum may include, for example the root mean square (RMS) error method from the set of point deviations given by $$RMS = \sqrt{\Sigma(\text{targetspectrumvalue} - \text{compositespectrumvalue})^2}$$

Alternately, a weighted RMS method may be used where one or more portions of the spectrum that are of particular interest may be weighted relative to other portions. Another goal function that may be used is the total deviation given by $$\text{Total deviation} = \Sigma |\text{target spectrum value} - \text{composite spectrum value}|^2$$

where the vertical bars represent the absolute value.

Figure 11:
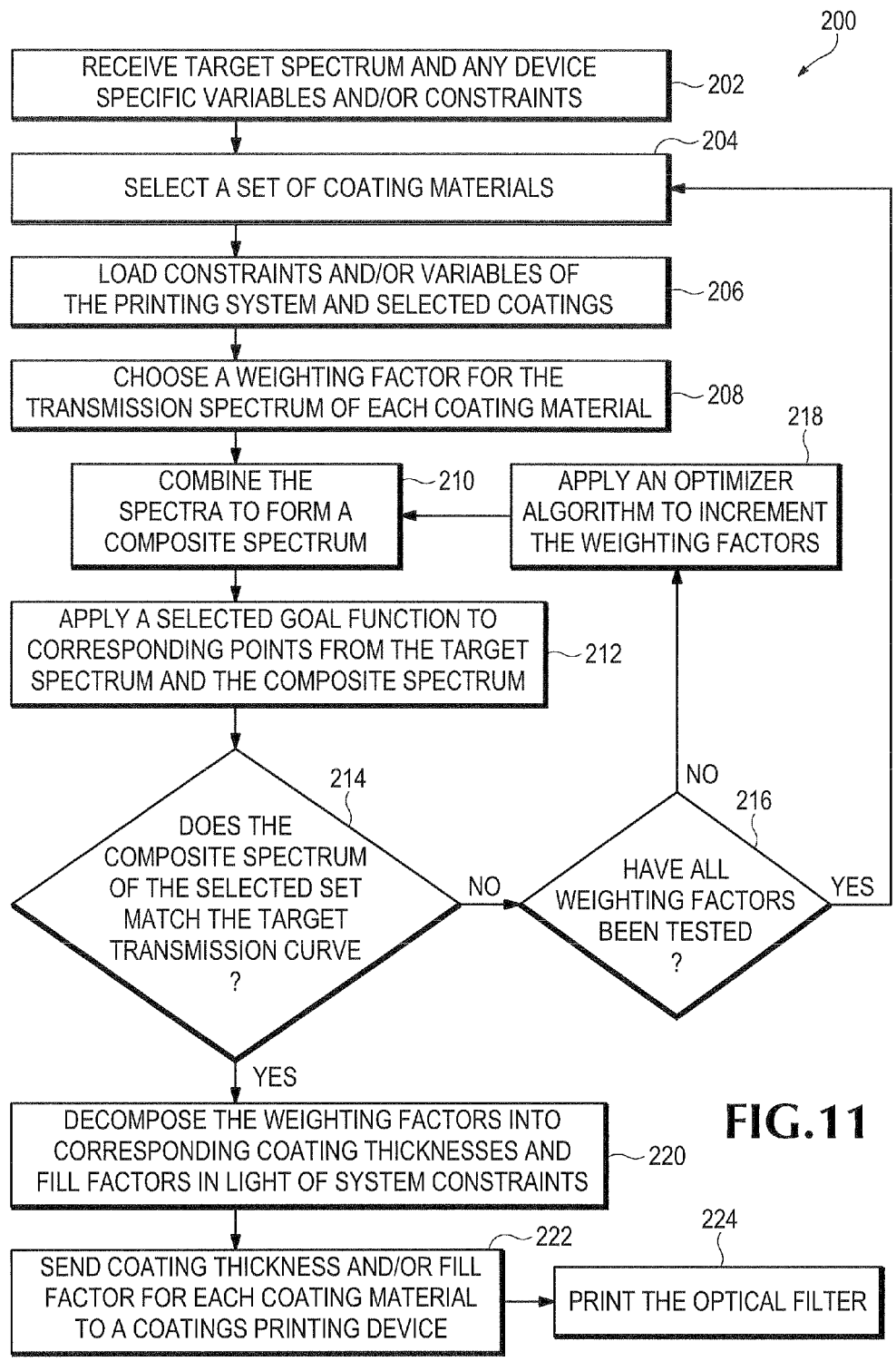
FIG. 11 shows a flowchart of a method for optimizing a composite transmission spectrum of a discontinuous thin film optical filter to match a received target spectrum.

Turning now to FIG. 11, there is shown a flow diagram for an optimization method for the matching of a composite transmission spectrum to a received target transmission spectrum. Although the method has been developed within the context of printed discontinuous coating optical transmission filters, the method applies equally to continuous film coating optimization and mixed continuous/discontinuous optical filters. The order of items in the flow diagram is shown for exemplary purposes, and many changes in the order may be made without affecting the result. First, the target transmission spectrum is received, for example by a designer of optical devices, along with device-specific variables and/or constraints 202. The received variables and/or constraints may include, for example, overall dimensions of the resultant filter, dimensions and spacings of discontinuous coating features, requested coating types, type and form of a goal function, type of optimization algorithm, and spectral range over which matching should be optimized, for example.

Next, a set of prospective coating materials is selected whose transmission spectra has features showing absorption over wavelength ranges where the target spectrum shows absorption 204. Constraints and/or variables of the printing system and selected coatings are then loaded 206. These constraints and/or variables may comprise, for example, printing system control parameters, size constraints, a layout of placements of the resultant optical filter placement upon one or more substrates to be printed, the spectra of the coatings, thickness of resultant coating layer after drying and curing, and other coating properties such as percent solids, solvent type, viscosity, or other constraints and/or variables of the printing system and/or coatings. An initial weighting factor is then chosen for each coating material and each coating material spectrum is weighted by its corresponding weighting factor 208.

An illustrative example of coating material selection and weighting follows. In FIG. 9 if target spectrum 1 (the broad bell-shaped spectrum) is to be matched, all five of the coating material films shown in FIG. 10 would be selected, with the spectra of coating film 3 (the middle spectra) given a large weighting factor, coating films 2 and 4 given medium weighting factor, and coating films 1 and 5 given small weighting factors.

After weighting the individual spectra of the selected coating materials, the weighted coating component spectra are combined to form a composite spectrum 210, for example according to equation (4), or in the case of an optical component design specification requiring one or more continuous thin films, according to equation (2), or a combination thereof for device specifications in which both continuous and discontinuous films are desired.

Once the composite spectrum is formed, a selected goal function (RMS, weighted RMS, total deviation function, for example) is applied to corresponding points from the target spectrum and the composite spectrum 212. Once the RMS or total deviation is calculated for the composite spectrum at a series of wavelengths (for example every 50 angstroms over a selected range of wavelengths) relative to the target spectrum 212, the result may be stored for subsequent evaluation after proceeding through a method loop comprising steps 216, 218, 210, 212, 214, and/or method loop 216, 204, 206, 208, 210, 212, 214 to minimize the selected goal function. Alternately, or additionally, the calculated goal function, RMS or total deviation, for example, may be compared with a selected or predetermined allowable threshold, for example a maximum RMS of 0.900, to determine whether the composite spectrum of the selected set adequately match the target transmission spectrum 214 over the selected range of wavelengths or frequencies 214.

When the calculated goal function has not been minimized or a threshold met, a determination of whether all weighting factors within a selected or predetermined series within a range of weighting factors for each component is made 216. If the multiple series of weighting factors have not been fully explored, an optimizer algorithm is applied to the results to increment the weighting factors of each coating component so that the goal function may be further minimized 218, and the optimization loop for that particular set of selected coatings comprising steps 210, 212, 214, 216, 218 is executed to find one or more minima for that set of selected coatings. Optimization algorithms used in step 218 may include, for example, a parabolic interpolation algorithm, a Brent's method algorithm, a one-dimensional search with first derivatives algorithm, a downhill simplex algorithm, a direction set (Powell's) algorithm, a conjugate gradient algorithm, a variable metric algorithm, a linear programming algorithm, a simplex method algorithm, a simulated annealing algorithm, or a gradient descent algorithm. The optimization algorithm analyzes the differences between the calculated composite spectra and the target spectrum to modify the weighting factors applied to each of the component coating spectra.

Once loop 210, 212, 214, 216, 218 has been fully explored to a selected or predetermined level of granularity, a comparison of one or more identified minima in the goal function with a predetermined or selected threshold is further made in evaluation step 214. When the minima do not indicate an adequate match in step 214, and the range of weighting factors for each component coating has been fully explored, as determined in step 216, another set of coating materials may be selected 204, and the method may proceed through loop 204, 206, 208, 210, 212, 214, 216, and to a plurality of runs through loop 210, 212, 214, 216, 218.

At step 214, once an adequate minimum or match is found, the composite spectrum may be displayed superimposed upon the target spectrum for a visual verification of the match. Typically the results are displayed so that the target spectrum is displayed in one color or line weight and the composite spectrum is displayed in a second color or line weight so that the curves are easily distinguished from one another. Then the weighting factors may be decomposed into corresponding coating thicknesses and fill factors in light of the system constraints 220. Many coating thicknesses and fill factors may already be determined at this point, so step 220 may present alternate combinations for selection.

Then the coating thickness and/or fill factor for each coating material is sent to a coating manufacturing device in step 222, such as the coatings printing device. Then one or more optical filters are printed 224. It should be noted that although this process has been described within the context of producing optical transmission filters comprising discontinuous coating layers, that the process may also be used in the construction of optimized continuous film optical filters, or combinations of continuous and discontinuous layers. In the case of continuous coatings, the coating thickness of each component layer may be finely incremented to find an optimized solution. For applications that use discontinuous coatings, the fill factor that is finely incremented to find an optimized solution, where the coating layer thickness is typically held constant for a particular coating chemistry and solvent system, since the economies of optical filter printing lie in using a fixed number of coating solutions, each of which generally produce a specific coating thickness when printed, dried and cured. Furthermore, the method of FIG. 10 may be used to manufacture any optical filter. Additionally, the method of FIG. 10 may be executed by a microprocessor device configured to instruct another device to produce the optical filter.

Figure 12:
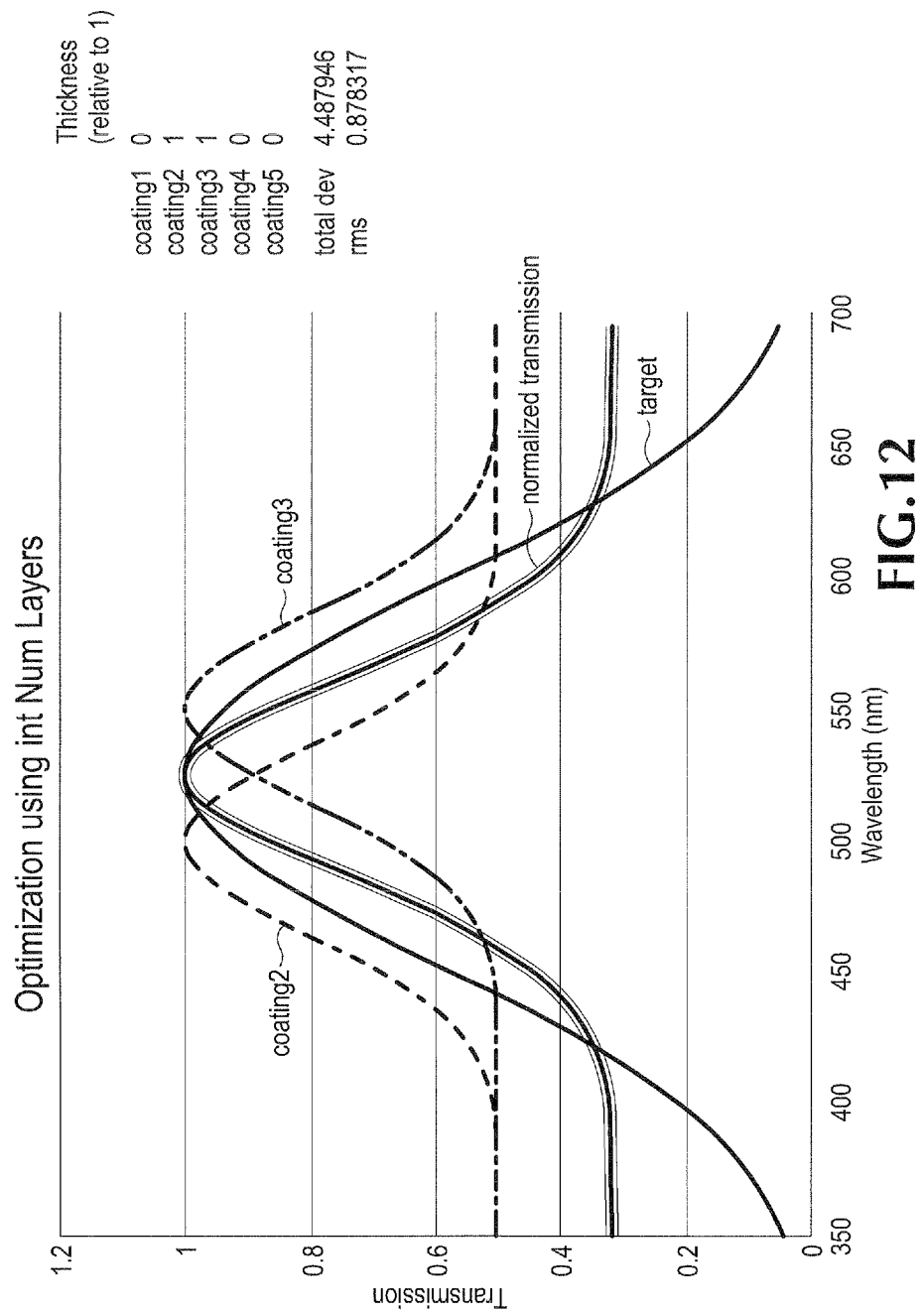
FIG. 12 shows exemplary optimization results for an integer number of continuous coating layers.
Figure 13:
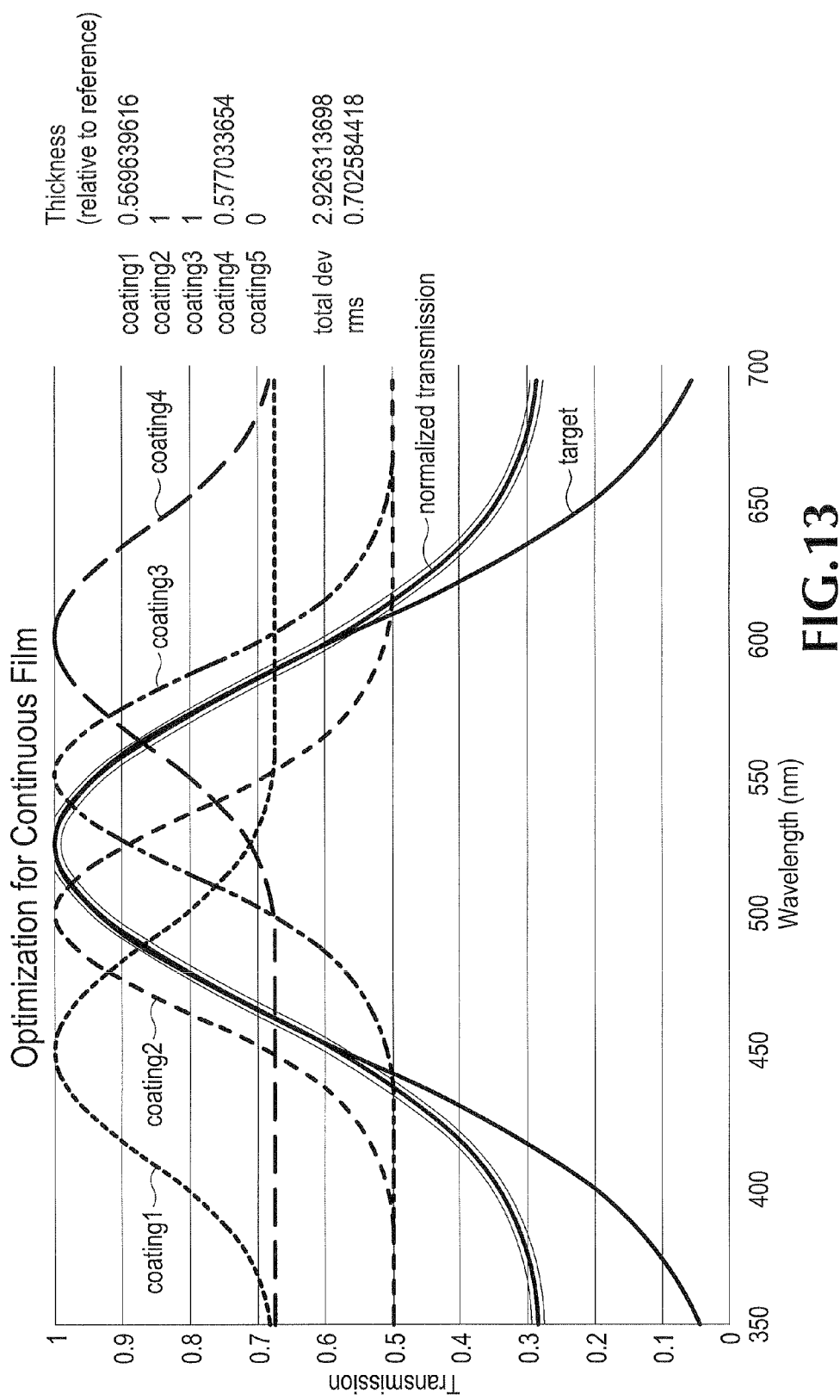
FIG. 13 shows exemplary optimization results for continuous coating layers whose thickness is continuously variable.
Figure 14:
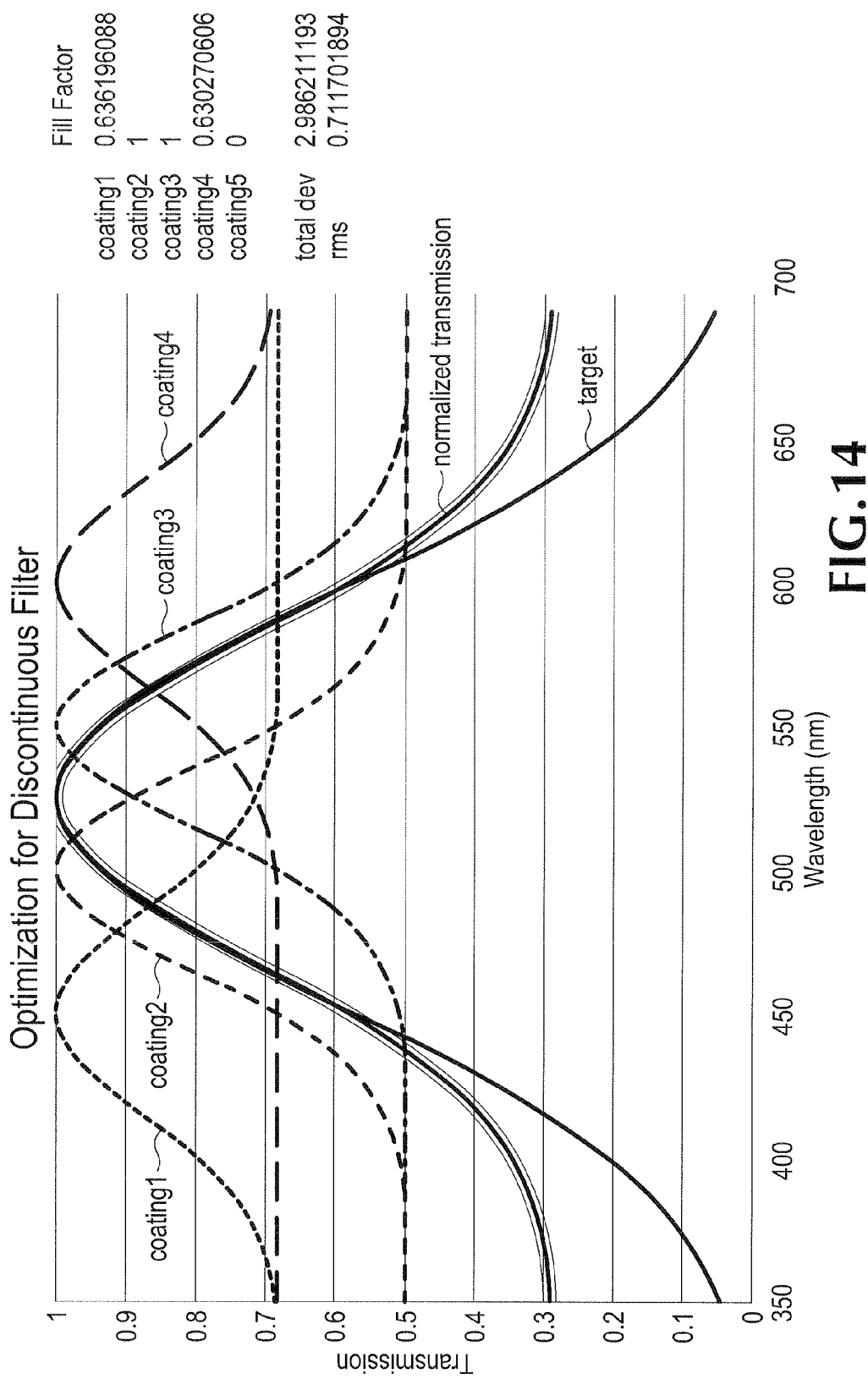
FIG. 14 shows exemplary optimization results for discontinuous coating layers whose thickness is an integer number.

Turning now to FIGS. 12-14 there are shown three exemplary cases whose results were obtained from the method of FIG. 11. In all three cases, an identical coating set comprising five potential component coatings was selected, where two of the five component coatings were constrained to have integer relative thickness values for comparison purposes. In addition, the wavelength range used for the optimization in each case is from 345 nm to 695 nm. The target function used in these three examples is the total deviation where the sum of absolute difference between the composite spectrum and target spectrum was determined at each wavelength from 345 to 695 in 5 nm increments.

FIG. 12 shows calculations using two further constraints, namely those of requiring continuous coatings, and requiring integer values of relative thickness of each coating layer (i.e. the minimum coating layer thickness of a first coating is defined as 1 and the coating layer thicknesses of each additional component must be an integer factor of the first coating layer thickness.) This solution is particularly relevant to situations where an optical filter producer has predefined costing solutions and predefined coating technologies where coating thicknesses are fixed to incremental layer thicknesses (e.g. coating layers are applied in discrete predetermined thicknesses and are built up in an incremental fashion, for example).

FIG. 12 shows a target transmission spectrum along with an optimized composite spectrum calculated generally by the method of FIG. 11 for continuous coatings having integer thickness values. In particular, the composite coating of FIG. 12 comprises two components, from the selected set of five potential coating components, each having identical relative thicknesses, as reflected by relative thickness values of 1. The component spectrum of each of the two components is also shown in FIG. 12. This particular optimization yielded a minimized total deviation of 4.488, along with a separately calculated RMS of 0.8783. The production of filters using these constraints typically yields less precise matches than the methods described below.

FIG. 13 shows a target transmission spectrum along with an optimized composite spectrum calculated generally by the method of FIG. 11 for continuous coatings having continuously variable thickness values. Although the method applies to the situation where all coating component thicknesses may be continuously variable, this case, like the other exemplary cases, was further constrained so that two primary component coatings whose spectra are close to the target spectrum are coated in an integer coating thickness, and secondary or fractional layers (relative to the integer layers) are deposited to tune in the target spectrum, for comparison purposes. In particular, the composite coating of FIG. 13 comprises four components, from the selected set of five potential coating components, where the two primary coating components were constrained to have relative thicknesses of 1, and the remaining two secondary component spectra were unconstrained to obtain real number thickness values to tune the target spectrum in. The target spectrum and the resulting composite spectrum component spectrum are shown in FIG. 13, along with the four component spectra. This particular optimization yielded a minimized total deviation of 2.926, along with a separately calculated RMS of 0.7026. The production of filters using these constraints typically yields precise matches, although the precise tailoring of coating thicknesses typically uses a custom formulation of coatings and/or coating technologies capable of producing precisely monitored deposition thicknesses of the real-valued thicknesses.

FIG. 14 shows a target transmission spectrum along with an optimized composite spectrum calculated generally by the method of FIG. 11 for discontinuous coatings having continuously variable weighting values, where a weighting value comprises a coating component thickness combined with a fill factor. In this case, the target spectrum may typically be easier to reproduce in a physical filter because in general it is easier to execute an incremental change in fill factor to tune in a target spectrum than to execute an incremental change in the thickness of a continuous film. The composite coating of FIG. 14 comprises four components, from the selected set of five potential coating components, where the two coating components spectra closest to the target spectrum were further constrained as in the other two exemplary cases to be continuous films of relative thicknesses of 1, combined with two secondary components whose fill factors were unconstrained to obtain real number values to tune the target spectrum in. The target spectrum and the resulting composite spectrum component spectrum are shown in FIG. 14, along with the four component spectra. This particular optimization yielded a minimized total deviation of 2.986, along with a separately calculated RMS of 0.7117. An advantage of this type of embodiment is that highly tuned composite spectra may be produced with a printing device where predetermined coatings are printed through a print head in predetermined thicknesses, where the calculated fill factor for each component is easily achieved when printing the component coatings on the substrate. This precise matching of spectra make the microengineered optical filters particularly well suited to applications involving electromagnetic radiation sources and/or electromagnetic radiation sensors that are wavelength-specific or spectrum-specific, that is, where the output of a source or the response of the sensor needs to be tuned according to a specific spectrum, rather than color, for example, since a particular color may be achieved through a multitude of spectra.

Figure 15:
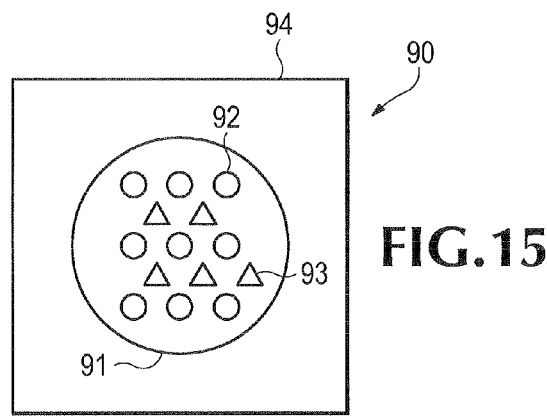
FIG. 15 is a frontal or top view of a composite microengineered optical filter.

Turning now to FIG. 15, there is shown a composite microengineered optical filter 90 made with the system 50 of FIG. 5. The microengineered optical filter 90 comprises a substrate 94 having an electromagnetic radiation receiving area 91 with two optical coating "layers," a first optical coating layer comprising discontinuous films (shown as triangular dots here) of a first coating material 92 and a second optical coating layer comprising discontinuous films (shown as circular dots here) of a second coating material 93. Because the first coating material 92 and the second coating material 93 may have different thicknesses, they have been described as "layers," even though they may both be deposited directly upon the top surface of the radiation receiving area 91 of substrate 94. Alternately, the layers may be deposited directly upon one another, or in an overlapping fashion as shown, for example in FIG. 17. As electromagnetic radiation incident to the electromagnetic radiation receiving area 91 passes through the microengineered optical filter 90, the spectrum of the incident electromagnetic radiation is affected according to the fill factors of both coating layers, as well as the inherent transmission spectra of the two coating materials 92 and 93.

Diffraction Effects

Figure 16:
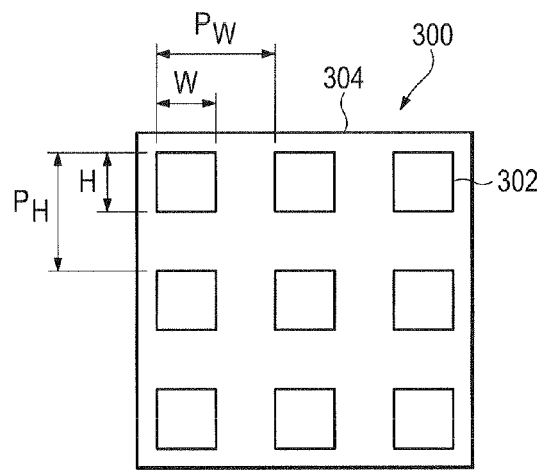
FIG. 16 shows a top view of a discontinuous optical transmission filter of a planar array of dots, where the dots comprise rectangles, where the rectangle dimensions may be sized independently, and the period in each of two orthographic directions may be specified independently to produce diffraction effects.
Figure 18:
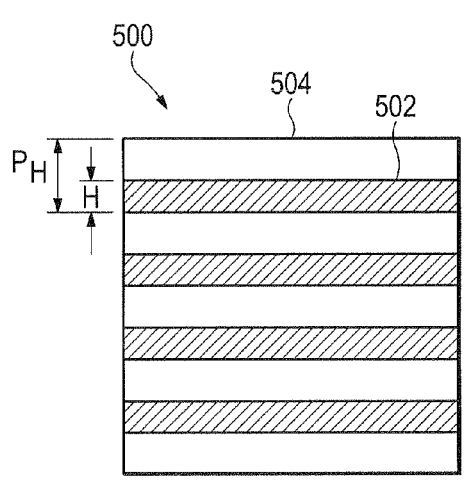
FIG. 18 shows a top view of an optical transmission filter of a linear array of strips, where the strips may be sized to produce diffraction effects.
Figure 19:
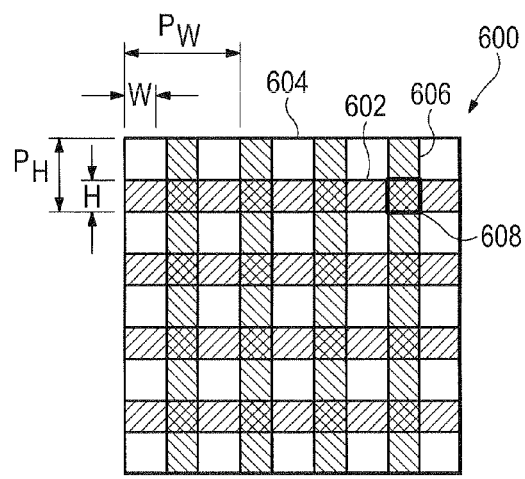
FIG. 19 shows a top view of an optical transmission filter of two linear arrays of strips, where each set of strips may be sized and spaced independently to produce diffraction effects.

Electromagnetic radiation traveling through the microengineered optical filters can be diffracted. Such diffraction can be optimized for a particular application by producing a microengineered optical filter having a linear or planar array of features whose dimensions and periodicity are on the same order as the wavelength or wavelengths of the electromagnetic radiation that want to be diffracted. Examples of such filters are given in FIGS. 16, 18, and 19. FIG. 16 gives an example of a discontinuous-coating transmission filter 300 comprising a planar array of dots 302, shown in the shape of rectangles of width W (and corresponding period $P_w$) and height H (and corresponding period $P_H$) on substrate 304. Dots comprising other shapes, such as circular shapes or triangular shapes are also contemplated and can be constructed. Although an orthogonal planar array is shown in FIG. 16, nonorthogonal planar arrays are also contemplated. FIG. 18 gives an example of a discontinuous-coating transmission filter 500 comprising a linear array of strips 502 of height H and period $P_H$ on substrate 504. FIG. 19 gives an example of a discontinuous-coating transmission filter 600 comprising two linear arrays of strips 602 of height H and period $P_H$ and strips 606 of width W and period $P_W$, shown here intersecting at 90 degree angles, on substrate 604. Intersection angles other than 90 degrees are also contemplated. Strips 602 may be comprised of a coating material of different composition than strips 606, or they may be the same material. The intersection 608 of the two sets of strips may be comprised of a coating layer of each material, for example, or alternately, may be comprised of only one coating layer. The arrays of FIGS. 16 and 19 both have two sets of features W and $P_W$, and H and period $P_H$ that can be tuned to one or more wavelengths in two planes. FIG. 18 may be tuned to diffract electromagnetic radiation in one plane.

Figure 17:
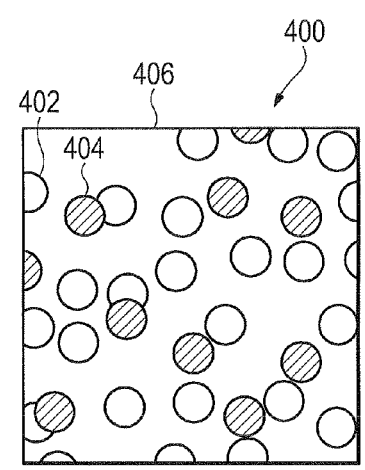
FIG. 17 shows a top view of a discontinuous optical transmission filter comprising coating dots that are randomly distributed for a two component filter, where the dots comprise circles.

In applications where diffraction effects are to be avoided, features may be printed in a random fashion, such as the exemplary pattern shown in the optical transmission filter 400 shown in FIG. 17. The optical transmission filter 400 of FIG. 17 comprises coating dots 402 of one coating material and coating dots 404 of another material, for example, on substrate 406. Because the distribution of the dots is not periodic, diffraction will be minimized. Although the dots of FIG. 17 are shown as circular, other shapes are contemplated and may be used, and the dots may or may not be overlapping. In addition, multiple depositions of a single layer material can average non-random artifacts in the printed film. Pixel size and amount of randomization depend on the application.

It should be understood that even though these numerous characteristics and advantages of various embodiments have been set forth in the foregoing description, together with details of the structure and function of the embodiments, the disclosure is illustrative only, and changes may be made in detail, especially in matters of shape, size and arrangement of parts within the principals of the claimed embodiments in the appended claims to the full extent indicated by the broad general meaning of the terms in that the appended claims are expressed.

What is claimed is:

1. A system, comprising:
a printing device having a printing resolution; and
a processor configured to:
receive a target transmission spectrum for an optical filter design, wherein an optical filter filters electromagnetic radiation in the ultraviolet, visible, infrared, or combinations thereof, regions of the electromagnetic spectrum;
select a set of one or more filter component materials based, at least in part, on a stored transmission spectrum of each component;
multiply the stored transmission spectrum of each selected filter component material by an associated component weight factor to produce a weighted transmission spectrum for each selected filter component material;
combine the weighted transmission spectrum of each selected filter component material to produce a composite transmission spectrum;
optimize the value of the component weight factor associated with each component material so that the composite transmission spectrum matches the received target transmission spectrum;
calculate a corresponding fill factor and a thickness for each selected filter component material based, at least in part, upon the component weight factor associated with each selected filter component material, wherein the fill factor comprises a fraction of a filter area to be covered by the filter component material; and
cause the printing device to print each of the selected filter component materials according to its corresponding thickness and fill factor to form an optical filter.

2. The system of claim 1, wherein the transmission spectrum of the printed optical filter matches the composite transmission spectrum.

3. The system of claim 1, wherein the transmission spectrum of the printed composite optical filter matches the target transmission spectrum of the optical filter design, wherein the printed composite optical filter comprises the selected filter component materials, and wherein each selected filter component material is printed according to its corresponding fill factor and thickness.

4. An optical filter, comprising:
a substrate material; and
one or more optical coatings, wherein each optical coating comprises a filter component material, and wherein at least one of the one or more optical coatings is deposited as a plurality of discontinuous thin films on the substrate, wherein a composition of the optical filter is determined by:
receiving a target transmission spectrum for an optical filter design, wherein the optical filter filters electromagnetic radiation in a range from 10 nanometers to 1500 nanometers of the electromagnetic spectrum;
selecting a set of one or more filter component materials based, at least in part, on a stored transmission spectrum for each filter component material;

multiplying the stored transmission spectrum of each selected filter component material by an associated component weight factor to produce a weighted transmission spectrum for each selected filter component material;

combining the weighted transmission spectrum of each selected filter component material to produce a composite transmission spectrum; and optimizing the value of the component weight factor associated with each filter component material so that the composite transmission spectrum matches the received target transmission spectrum.

5. The optical filter of claim 4, wherein a fill factor and a thickness of each of the one or more optical coatings is determined based, at least in part, on the optimized component weight factor of the transmission spectrum of each filter component material of the selected set of one or more filter component materials, and wherein the fill factor of an optical coating comprises a fraction of an electromagnetic radiation receiving surface of the optical filter that is covered by the optical coating.

6. The optical filter of claim 5, wherein the at least one of the one or more optical coatings is deposited as a plurality of randomly distributed dots on the substrate.

7. The optical filter of claim 5, wherein the at least one of the one or more optical coatings is deposited as a linear array of features having a width and a period, wherein the width and period are configured to diffract incident electromagnetic radiation.

8. The optical filter of claim 5, wherein the at least one of the one or more optical coatings is deposited as a substantially planar array of features having a width and an associated first period, and a height and an associated second period, wherein the width and the associated first period are configured to diffract incident electromagnetic radiation in a first set of directions, and wherein the height and the associated second period are configured to diffract incident electromagnetic radiation in a second set of directions.

\* \* \* \* \*